United States Patent

[11] 3,604,910

[72] Inventor Robert W. Kearns
20424 Rutherford Ave., Detroit, Mich. 48235

[21] Appl. No. 664,814
[22] Filed Aug. 31, 1967
[45] Patented Sept. 14, 1971

[54] PARALLEL COMPARATOR WITH SIMULTANEOUS CARRY GENERATION AND AN ANALOG OUTPUT

18 Claims, 16 Drawing Figs.

[52] U.S. Cl. .......... 235/177, 235/175
[51] Int. Cl. .......... G06f 7/50
[50] Field of Search .......... 340/146.2; 235/177, 175; 307/2

[56] References Cited

UNITED STATES PATENTS

| | | | |
|---|---|---|---|
| 3,303,464 | 2/1967 | Kolb | 340/146.2 |
| 3,134,913 | 5/1964 | Pederson | 307/2 X |
| 3,440,413 | 4/1969 | Betts | 235/175 X |
| 3,128,132 | 4/1964 | Erath | 307/2 |

*Primary Examiner*—Malcolm A. Morrison
*Assistant Examiner*—David H. Malzahn
*Attorney*—Whittemore, Hulbert & Belknap

ABSTRACT: A parallel comparator for digital signals, such as two binary coded numbers, comprising a plurality of parallel carry stages, each having a single semiconductor for receiving input signals representative of all the significant positions in the digital signals up to the particular stage and for providing an output signal in accordance with whether or not a carry output signal is required in the particular stage, an adding stage for each significant position in the signals to be compared, each having a single semiconductor for receiving the input signals in the respective significant position or stage from the input circuits, a carry signal for the respective stage and a carry-not signal from the next significant position or stage from the parallel carry stages, and analog ladder means for receiving the output from the adding stages to provide an analog comparator output signal.

The comparator includes means for providing a direct current or alternating current analog output signal and for varying the output signal in both directions from a zero signal as well as means for limiting the number of input signals to the parallel carry stages.

INVENTOR
ROBERT W. KEARNS

Whittemore,
BY Hulbert & Belknap
ATTORNEYS

| | |
|---|---|
| -1 | 0 |
| 0 | +1 |
FIG. 8
| | | | |
|---|---|---|---|
| -3 | -2 | -1 | 0 |
| -2 | -1 | 0 | +1 |
| -1 | 0 | +1 | +2 |
| 0 | +1 | +2 | +3 |
FIG. 9
| | | | | | | | |
|---|---|---|---|---|---|---|---|
| -7 | -6 | -5 | -4 | -3 | -2 | -1 | 0 |
| -6 | -5 | -4 | -3 | -2 | -1 | 0 | +1 |
| -5 | -4 | -3 | -2 | -1 | 0 | +1 | +2 |
| -4 | -3 | -2 | -1 | 0 | +1 | +2 | +3 |
| -3 | -2 | -1 | 0 | +1 | +2 | +3 | +4 |
| -2 | -1 | 0 | +1 | +2 | +3 | +4 | +5 |
| -1 | 0 | +1 | +2 | +3 | +4 | +5 | +6 |
| 0 | +1 | +2 | +3 | +4 | +5 | +6 | +7 |
FIG. 10
FIG. 11
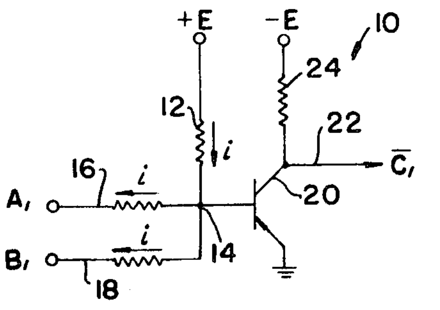
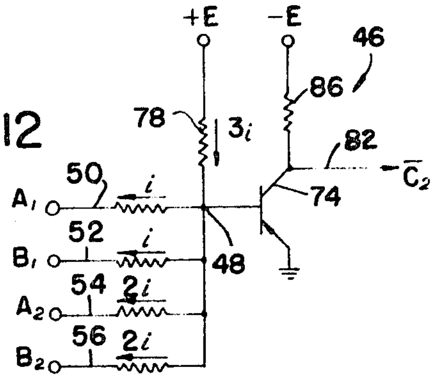
FIG. 12
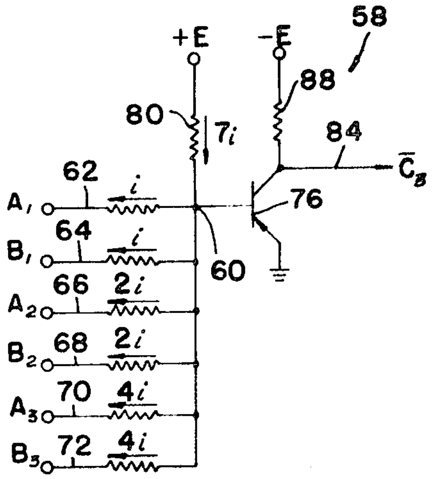
FIG. 13
INVENTOR
ROBERT W. KEARNS
BY Whittemore, Hulbert & Belknap
ATTORNEYS INVENTOR.
ROBERT W. KEARNS
BY Whittemore, Hulbert & Belknap
ATTORNEYS

90

INVENTOR.
ROBERT W. KEARNS
BY Whittemore, Hulbert & Belknap
ATTORNEYS

PARALLEL COMPARATOR WITH SIMULTANEOUS CARRY GENERATION AND AN ANALOG OUTPUT

BACKGROUND OF THE INVENTION

1. Field of the Invention

The relates to electronic computing structure and refers more specifically to a digital comparator including unique parallel carry circuits and a unique alternating current analog ladder.

2. Description of the Prior Art

Electronic control systems can generally be categorized as either open loop or closed loop systems. With a closed loop system feedback is provided from the output of the system to be compared with the input to the system to provide an actuating (error) signal to the system. A plurality of analog comparators are available for such control systems. However, there has in the past been a lack of a simple, economical and efficient digital comparator, so that the digital closed loop control systems have had slow progress.

The difficulty encountered by electronic designers in providing digital comparators in the past have been due to a plurality of limitations. Thus, in a digital circuit the logic units used in the past to form logic statements have been limited to a predetermined number of inputs and outputs. In addition, the prior logic circuits required for simple parallel adding and parallel carry circuits have been limited to a few basic functions. When these basic functions are used to implement the parallel carry Boolean expressions so many OR and AND gates for example are used in the more significant stages, that the accumulated time delay is greater than if the carries were allowed to propogate serially. Thus, in the past the number of semiconductors and the circuitry therefor to provide even a simple parallel comparator has been physically prohibitive and even if physically possible would be considerably slower than parallel operation would assume.

SUMMARY OF THE INVENTION

In accordance with the invention there is provided a parallel comparator for receiving a pair of coded input signals in digital form and for providing an analog output signal representative of the sum thereof using only a minimum of transistors and resistors. The output signal form the comparator may be either a direct current analog signal or an alternating current analog signal and may be varied in each direction about a zero potential. Also, the comparator output signal can be left in digital form.

The parallel digital comparator of the invention is made possible by a basic adding circuit including a single output channel and four input channels for receiving a pair of signals in a significant position in digital coded numbers, a carry signal and a carry-not signal operable to provide a complete logic statement rather than the basic functions of the past AND and OR gates and the like, and a similar basic parallel carry circuit including a single output channel and a plurality of input channels for receiving input signals from the digital coded numbers representing the significant position of the digital coded numbers with which the parallel carry circuit is associated and all preceding significant positions of the digital coded numbers.

DESCRIPTION OF THE DRAWINGS

FIGS. 8, 9 and 10 are current maps corresponding to the Karnaugh maps of FIGS. 5, 6 and 7.

FIGS. 11, 12 and 13 are parallel carry circuits corresponding to the current maps of FIGS. 8, 9 and 10.

DESCRIPTION OF THE PREFERRED EMBODIMENTS

Truth tables for addition are given in many basic texts. A truth table for binary coded digital numbers in the *i*th stage is set forth below:

| $C_i$ | $A_i$ | $B_i$ | $S_i$ | $C_{i+1}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

where $C_i$ = carry into the *i*th stage $A_i$ = addend in the *i*th stage $B_i$ = augend in the *i*th stage $S_i$ = sum in the *i*th stage $C_{i+i}$carry into the (*i*th+1) stage The Boolean expression for the sum $S_i$ is $$S_i=\overline{C}_i\overline{A}_iB_i+\overline{C}_iA_i\overline{B}_i+C_i\overline{A}_i\overline{B}_i+C_iA_iB_i$$

Figure 1:
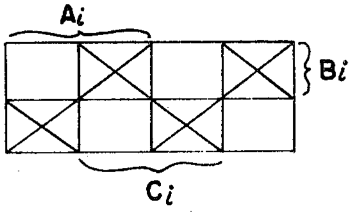
FIG. 1 is a Karnaugh map for a truth table for a three input adding circuit.

A Karnaugh map for the sum $S_i$ is given in FIG. 1.

If a circuit could be provided to implement the Boolean expression for $S_i$, as indicated by the Karnaugh map of FIG. 1, the circuit would be a simple adding circuit in which an added $A_i$ and augend $B_i$ and a carry signal could be added to provide the required output signal.

It has been found that certain transistor resistor circuits can implement complete Boolean expressions. Thus, for example, the Boolean expression $A_1 \cdot B_1$ may be implemented by the transistor resistor circuit 10 of FIG. 11, wherein with one unit of current provided from the bias circuit 12 toward junction 14 and one unit of current drawn from the junction 14 of FIG. 11 through each of the current drain circuits 16 and 18 in accordance with the presence of addend $A_1$ and augend $B_1$ signals respectively, the transistor 20 will be caused to conduct to provide an output on the output conductor 22 across resistor 24 only when $A_i$ and $B_i$ are both present, that is when the bias on the transistor 20 is negative. as shown in the current map of FIG. 8.

It is however impossible to easily implement the Karnaugh map of FIG. 1 by a single transistor resistor circuit or simple combinations of basic transistor resistor circuits, such as that of FIG. 11.

However, it has been found that by the use of redundant information, that is by providing a fourth input, a simplification results. Thus a truth table for a four input adding circuit corresponding to the Boolean expression $$S_i=\overline{C}_i\overline{A}_iB_i\overline{C}_{i+i}+\overline{C}_iA_i\overline{B}_i\overline{C}_{i+i}+C_i\overline{A}_i\overline{B}_i\overline{C}_{i+i}+C_iA_iB_iC_{i+i}$$

is given below:

| $C_{i+1}$ | $C_i$ | $A_i$ | $B_i$ | $S_i$ |
|---|---|---|---|---|
| 0 | 0 | 0 | 0 | 0. |
| 0 | 0 | 0 | 1 | 1. |
| 0 | 0 | 1 | 0 | 1. |
| 0 | 0 | 1 | 1 | D.C. |
| 0 | 1 | 0 | 0 | 1. |
| 0 | 1 | 0 | 1 | D.C. |
| 0 | 1 | 1 | 0 | D.C. |
| 0 | 1 | 1 | 1 | D.C. |
| 1 | 0 | 0 | 0 | D.C. |
| 1 | 0 | 0 | 1 | D.C. |
| 1 | 0 | 1 | 0 | D.C. |
| 1 | 0 | 1 | 1 | 0. |
| 1 | 1 | 0 | 0 | D.C. |
| 1 | 1 | 0 | 1 | 0. |
| 1 | 1 | 1 | 0 | 0. |
| 1 | 1 | 1 | 1 | 1. |

Figure 2:
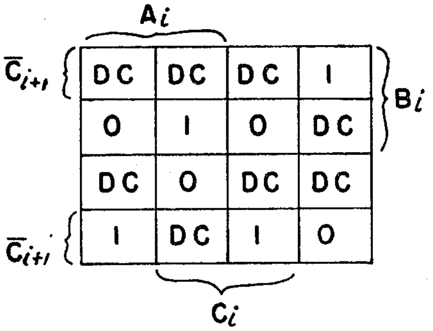
FIG. 2 is a Karnaugh map for a truth table for a four input adding circuit.

The Karnaugh map corresponding to the four input truth table for addition is given in FIG. 2. The corresponding current map is found in FIG. 3 and a transistor resistor adding circuit for implementing the truth table for the Boolean expression for four input adding is given in FIG. 4.

On inspection of the four input truth table for addition, it will be seen that the fourth, sixth through eleventh and thirteenth possibilities will never occur. That is to say, for example, considering the fourth possibility, there can never be a stage having both $A_i$ and $B_i$ signals present without a $C_i$ signal without also having a $C_{i+1}$ signal. Since these eight possibilities will never occur, they are termed Don't-Care conditions and the eight conditions that are left implement the addition truth table for three variables given above.

Figure 4:
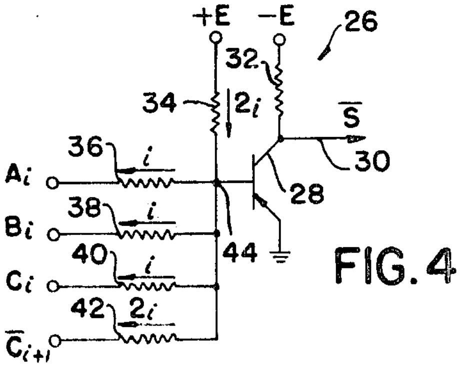
FIG. 4 is a four input adding circuit used in the invention.

The circuit of FIG. 4 is then an adding stage which will add binary coded digital numbers, that is signals which are either present or not present passed thereto as signals $A_i$ and $B_i$, providing there is also fed thereto a carry signal if one is necessary in the particular *i*th stage in which the adding circuit of FIG. 4 is used and provided there is fed thereto a carry-not signal from the next stage.

Thus with reference to the circuit 26 of FIG. 4, it will be seen that the transistor 28 will produce an output on the conductor 30 across the resistor 32 connected to the source of negative electrical operating potential at any time the signal on the base of the transistor 28 is negative.

The bias on the transistor 28 is weighted so that two units of current are fed toward the junction 44 from a source of positive bias voltage through the circuit 34 and the circuits 36, 38, 40 and 42 are chosen so that with the signal $A_i$ present one unit of current is drained from junction 44 through the circuit 36, with the signal $B_i$ present one unit of current is drained through the circuit 38, and with the carry signal $C_i$ present one unit of current is drained through the circuit 40. When the carry-not signal $C_{i+1}$ is present two units of current are drained from the junction 44 of the transistor 28 through the circuit 42 in a typical adding circuit. In the typical adding circuit 26 the source of negative electrical potential connected to the collector of the transistor 28 is minus 12 volts and the source of bias voltage is positive 12 volts. The emitter of the transistor 28 is connected to ground and resistors 32, 34, 36, 38, 40 and 42 may be 10K, 82K, 160K, 160K, 150K plus output impedance from $\overline{C}_i$ stage (equivalent to 160K) and 68K plus output impedance from $C_{i+1}$ stage (equivalent to 80K) respectively. The transistor should have a current gain of 20 minimum.

Consider now the first function in the Boolean expression for a four input sum as given above which is $\overline{C}_i\overline{A}_iB_i\overline{C}_{i+1}$. $B_i$ and $\overline{C}_{i+1}$ are the only inputs to the circuit 26. Thus two units of current will flow through the circuit 34 toward the junction 44 and three units of current will be drained off through the circuits 38 and 42. Thus, one unit of current must be drawn out from the base of the transistor (i.e., the base is negative) and the transistor will conduct.

Figure 3:
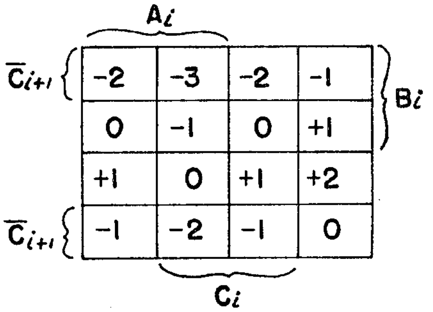
FIG. 3 is a current map corresponding to the Karnaugh map of FIG. 2.

This is in accordance with the four input truth table possibility 2 and the Karnaugh map of FIG. 2 and the current map of FIG. 3. That is to say, an output will be present on conductor 30 any time the base is negative on the transistor 28. An output on conductor 30 represents a 1 logic level while no output represents a zero logic level where the input signals to the circuits 36, 38, 40 and 42 have the same or similar logic.

Similarly with the third, fifth, and sixteenth possibilities in the four input truth table given above, there will be three units of current drawn from the junction 44 and two units fed to the junction so that the transistor 28 will conduct to provide an output on the conductor 30. The third, fifth and sixteenth possibilities in the four variable truth table above will be recognized as the second, third and fourth functions in the Boolean expression given above relating to four input adding circuits.

From the above it will be obvious that with the first, twelfth, fourteenth and fifteenth possibilities in the four input truth table given above, the current fed into the junction 44 from the bias source will be approximately equal to the current drained from junction 44 by the presence of $A_i$, $B_i$, $C_i$ or $\overline{C}_{i+1}$. The bias on the transistor 28 will therefore be positive or zero, so that the transistor 28 will be turned off. Thus, for example, with the first possibility when none of the signals $A_i$, $B_i$, $C_i$ and $C_{i+1}$ are present, the bias will be a positive two units of current fed to the junction 44 from the bias source. Also, with only $A_i$ and $B_i$, $B_i$ and $C_i$, and $A_i$ and $C_i$ signals present as in the twelfth, fourteenth and fifteenth possibilities in the four input truth table, two units of current will be drained from the junction 44 and two units fed thereto, whereby the bias on the transistor 28 will be zero so that it will not conduct.

Considering then that the other eight possibilities in the four input truth table, that is possibilities four, six through 11 and 13, cannot occur logically so that their input combinations will never be present in addition of binary coded numbers, it will then be seen that the circuit of FIG. 4 satisfies the logical requirements for the sum $S_i$, where zero and plus 1 bias correspond to off or no output on conductor 30, and a minus 1 bias corresponds to an on signal or a logical 1 on conductor 30.

It is also possible with single transistor and resistor circuits, such as circuit 28 to implement circuits which generate carry and carry-not signals required for use in simple arithmetic computations, such as addition, without the necessity of the previously used multiplicity of logic units, such as AND and OR circuits and the time required for the signals to propagate through the previously used plurality of series components. Also, with such units there will be no ripple time from the least significant to the most significant place for the carry signals.

Thus, consider that the parallel carry equations given in many standard texts are as follows:

$$
\begin{aligned}
C_1 &= A_1 \cdot B_1 \\
C_2 &= A_1 \cdot B_2 && = A_2 \cdot B_2 \\
&\quad +(A_2+B_2)\cdot C_1 && \quad +(A_2+B_2)\cdot A_1 \cdot B_1 \\
C_3 &= A_3 \cdot B_3 && = A_3 \cdot B_3 \\
&\quad +(A_3+B_3)\cdot C_2 && \quad +(A_3+B_3)\cdot A_2 \cdot B_2 \\
& && \quad +(A_3+B_3)\cdot(A_2+B_2)\cdot A_1 \cdot B_1
\end{aligned}
$$

where $C_1$, $C_2$, and $C_3$ are the carry signals to the second through fourth significant positions in a binary coded number to be added, $A_1$, $A_2$, and $A_3$, and $B_1$, $B_2$, and $B_3$ are the input signals in the first three significant positions of the binary coded numbers.

Figure 5:
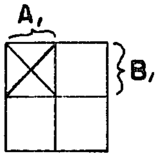
FIGS. 5, 6 and 7 are Karnaugh maps for parallel carry equations in three progressive stages.
Figure 6:
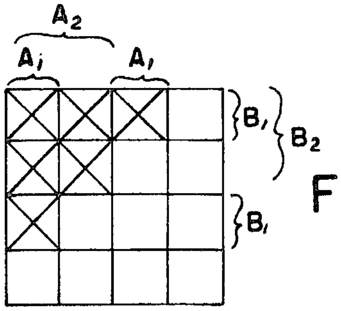
Figure 7:
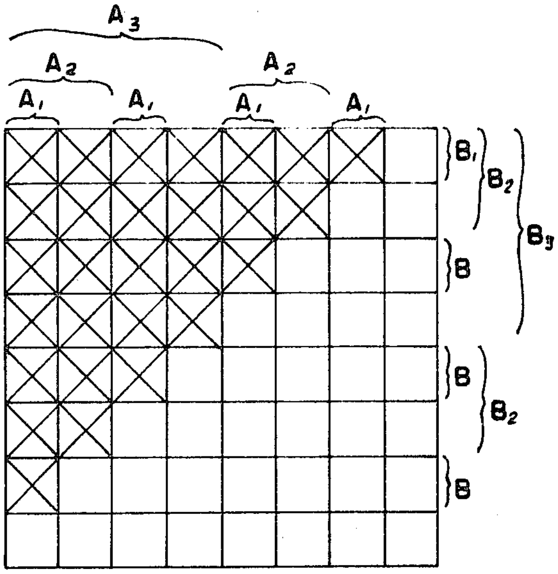

The corresponding Karnaugh maps for the three parallel carry equations given above are shown in FIGS. 5, 6 and 7. The corresponding current maps are given in FIGS. 8, 9 and 10, and the circuits implementing the current maps of FIGS. 8, 9 and 10 are shown in FIGS. 11, 12 and 13.

Thus, particularly referring to FIG. 11, for example, from the above it will be understood that the resistor transistor circuit 10 will conduct to produce an output signal only when both $A_1$ and $B_1$ are present, since only at this time will the current drain through circuits 16 and 18 be greater than the current input through circuit 12 to provide a negative bias for the transistor 20 to produce an output on conductor 22 across the resistor 24.

Similarly the four input resistor transistor circuit 46 of FIG. 12 will conduct only when sufficient signals are present simultaneously to drain more than three units of current from the junction 48, through circuits 50, 52, 54 and 56 and the six input resistor transistor circuit 58 of FIG. 13 will conduct only when more than seven units of current are drawn from the junction 60 through the circuits 62, 64, 66, 68, 70 and 72 due to the presence of signals in the indicated significant positions in binary coded digital signals to be added, whereby the positive bias on the transistors 74 and 76 supplied by circuits 78 and 80 will be overcome and an output will be provided on the conductors 82 and 84 across the load resistors 86 and 88 respectively.

A negative bias will represent an output from the transistors indicating a carry-not signal, while a positive bias or a zero bias will represent no output from the transistors 20, 74 and 76 or a carry signal to second, third and fourth stages respectively.

Adding circuits 24 and parallel carry circuits, such as circuits 10, 46 and 58 may be combined to provide a particularly simple, economical and efficient comparator in which comparison is effected by adding binary coded numbers, one of which is put into the comparator in negative form, so that when it is added to the other, a subtraction or comparison is made.

Figure 14A:
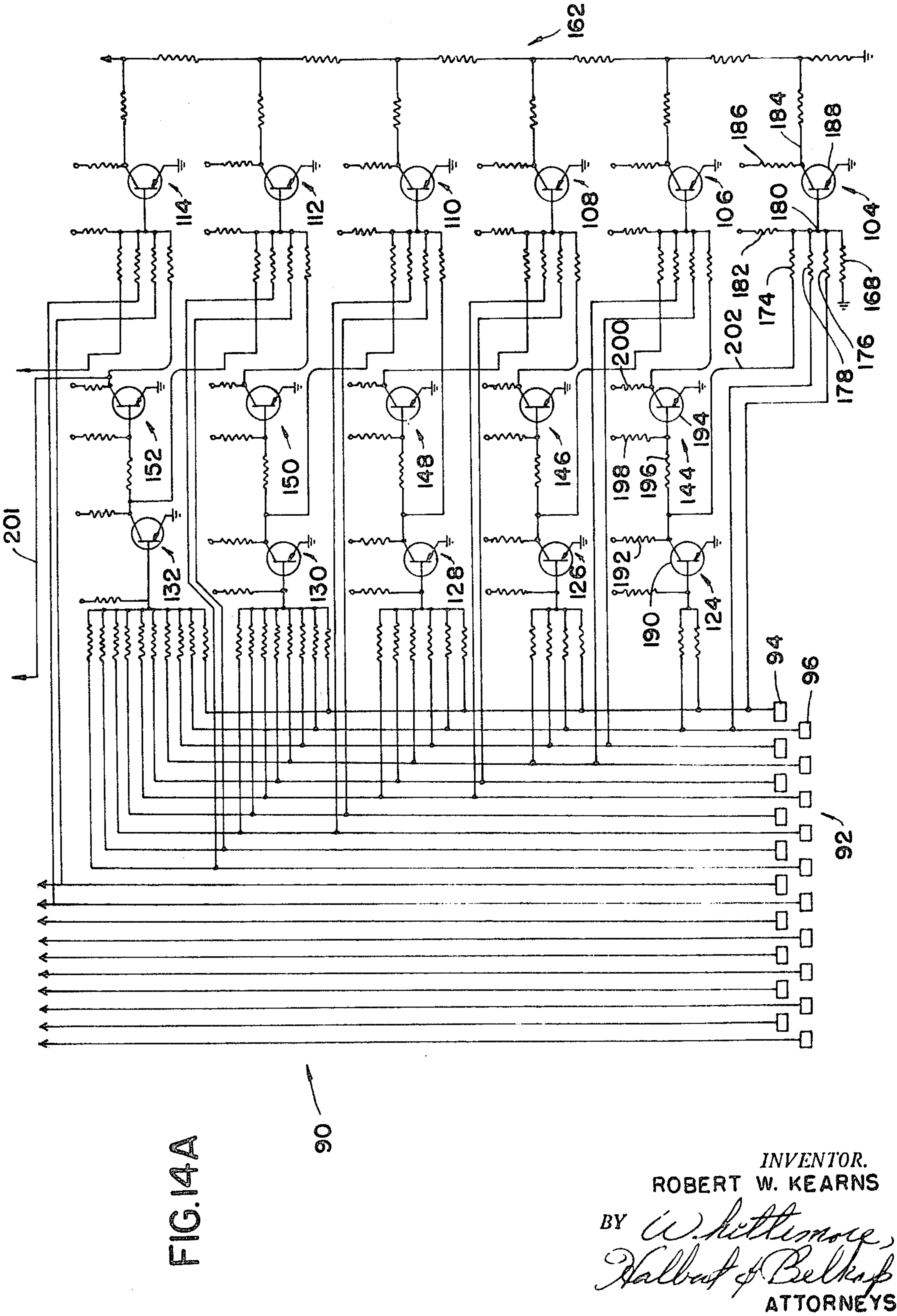
FIGS. 14A and 14B are together a schematic diagram of a comparator constructed in accordance with the invention, using adding circuits, such as shown in FIG. 4, and parallel carry circuits, such as shown in FIGS. 11, 12 and 13.
Figures 14B, 15:
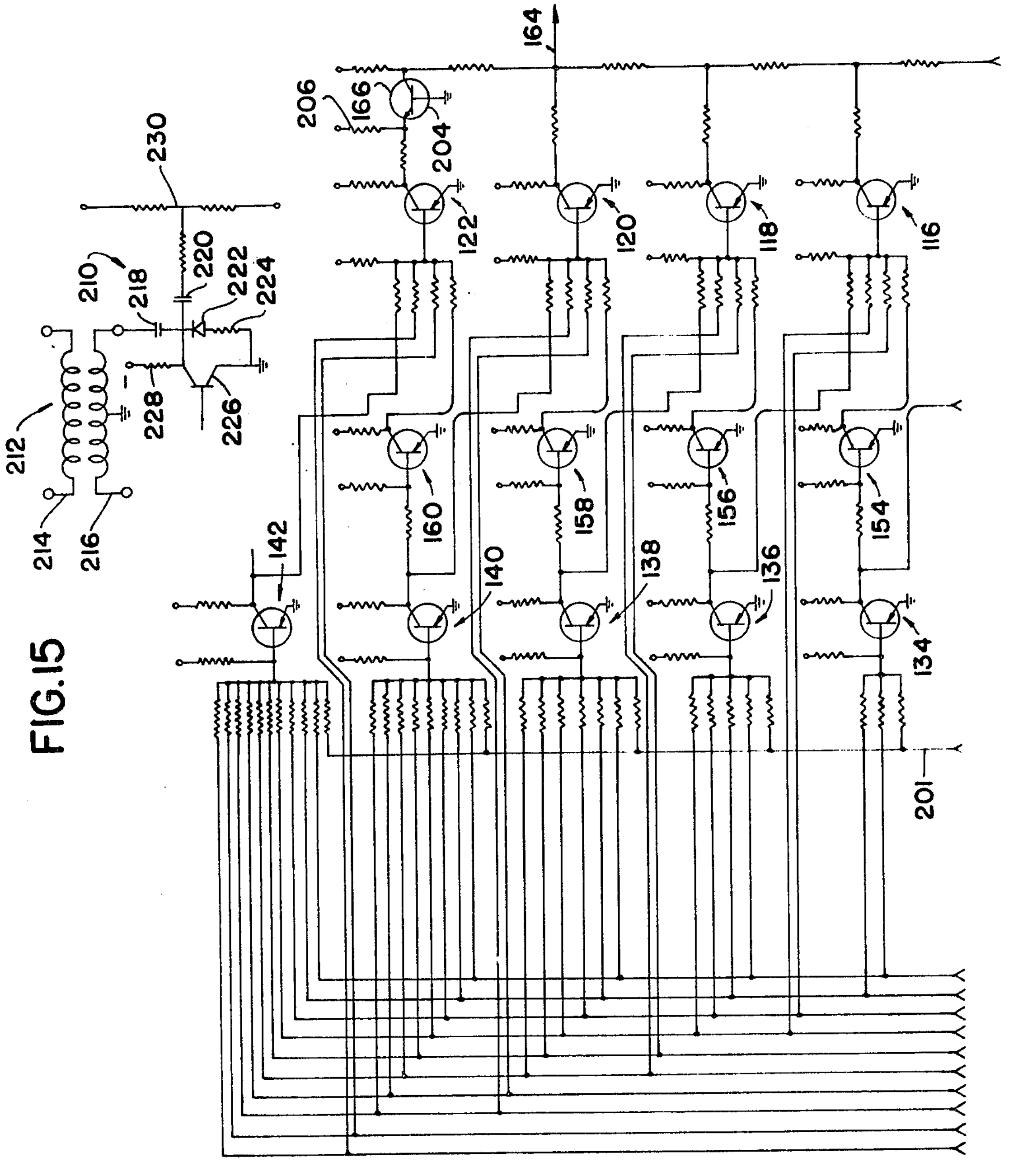
FIG. 15 is a schematic diagram of a modification of the comparator illustrated in FIGS. 14A and 14B showing the changes necessary to provide an alternating current output.

The comparator 90, illustrated best in FIGS. 14A and 14B, includes an input circuit 92 which is any source of a pair of digital binary coded numbers to be compared and which for convenience is shown as input registers 94 and 96 having ten significant positions, ten adding circuits 104, 106, 108, 110, 112, 114, 116, 118, 120 and 122 for the ten stage comparator and ten parallel carry circuits 124, 126, 128, 130, 132, 134, 136, 138, 140 and 142. Each of the second through tenth stages of the comparator has an inverter circuit 144, 146, 148, 150, 152, 154, 156, 158 and 160 associated therewith. An analog ladder 162 is provided to receive the output from the adding circuits 104 through 122 as indicated to provide an analog output on the conductor 164 which output can be varied between −512 and +512 due to the provision of an inverter circuit 166 in conjunction with the tenth stage of the comparator 90.

The adding circuits 104 through 122 are entirely similar to the adding circuit 26 in their operation. Thus, referring to adding circuit 104, resistor 168 is grounded since there cannot be a carry from a preceding stage inasmuch as transistor 188 is connected to the least significant position of the input registers 94 and 96. There may or may not be a carry-not signal input over resistor 174 from the parallel carry circuit 124 as will be considered subsequently. There similarly may or may not be a signal in the least significant position of the input register 94 to produce an input through the resistor 176, and there may or may not be a signal in the least significant position of the input register 96 to provide current drain from the junction 180 through the resistor 178.

The current input to the junction 180 through the resistor 182 is again two units. Thus, in accordance with the operation of the previously indicated adding circuit 26, an output signal will be provided on conductor 184 to implement the basic addition equations given previously across the resistor 186 due to conducting of the transistor 188.

Circuit 124 functions exactly the same as circuit 10 previously considered. The signal out of the transistor 190 across resistor 192 on conductor 202 is a carry-not signal.

Thus, for example, if the signals in the least significant position in the registers 94 and 96 are both present which would cause conducting of the transistor 20 in FIG. 11, transistor 190 conducts to ground resistor 174. This provides no carry-not signal to the adding circuit 104. However, the output from the transistor 190 must then be inverted to provide a carry signal to the adding circuit 106.

As shown, the inverter circuit 144 includes the transistor 194, resistor 196, resistor 198, and resistor 200 connected in the usual inverter configuration. Inverter transistor 194 is biased off when transistor 190 conducts to provide the carry signal to adding circuit 106.

The stages two through four of the comparator 90 which include the parallel carry circuits 126 through 130, the inverter circuits 146 through 150 and the adding circuits 106 through 112 are similar to the comparator stage one just considered. However, the parallel carry circuit 132 has about as many input circuits as is practical. Therefore, a conductor 201 has been connected to the parallel carry circuit 132 of stage five, whereby each of the following five parallel carry circuits start anew with a signal representing the carry function in the fifth stage. In the terms of the basic carry equations given above a $C_5$ signal is provided from stage 5 to reduce the number of inputs necessary to the parallel carry circuit transistors 134 through 142.

The additional Boolean equations for carry 6 through 8 are thus as follows, wherein $C_5$ is known as an auxiliary carry function. Longer numbers could be added by using more auxiliary carry functions.

$$C_6 = A_6 \cdot B_6 + (A_6 + B_6) \cdot C_5$$

$$C_7 = A_7 \cdot B_7 + (A_7 + B_7) \cdot C_6 = A_7 \cdot B_7 + (A_7 + B_7) \cdot A_6 \cdot B_6 + (A^7 + B_7) \cdot (A^6 + B_6) \cdot C_5$$

$$C_8 = A_8 \cdot B_8 + (A_8 + B_8) \cdot C_7 = A_8 \cdot B_8 + (A_8 + B_8) \cdot A_7 \cdot B_7 + (A_8 + B_8) \cdot (A_7 + B_7) \cdot A_6 \cdot B_6 + (A_8 + B_8) \cdot (A_7 + B_7) \cdot (A_6 \cdot B_6) C_5$$

The valve of the collector resistor in transistor stage 152 and the value of the resistor in transistor stage 114 would be changed to reflect the increased loading caused by the $C_5$ signal. Comparator stages six through nine are all alike and differ from the stages one through four only in that the $C_5$ signal is carried through the rest of the stages to reduce the number of inputs to the parallel carry transistors.

As indicated above, stage ten of the comparator 90 differs from the other stages in that there is an inverter circuit 166 including the transistor 204 and associated resistor 206 in the usual configuration in the output of the adding circuit 122. Thus, the output from the final stage of the comparator 90 is positive on the analog ladder 162, while the output from the stages one through nine of the comparator 90 are negative. Therefore, the analog output from the analog ladder 162 on conductor 164 may be either negative or positive from a zero potential approximately 511 or 512 units with a ten stage comparator.

The operation of the analog ladder 162 is well known and will not therefore be considered in detail herein. It will suffice to say that in the usual operation of an analog ladder, the signal provided on the output conductor 164 due to an output from adding circuit 104 will in accordance with the binary code used in the embodiment of the comparator shown in FIGS. 14A and 14B provide a voltage output of unity value. The output provided on the conductor 164 due to the adding circuits 106, 108, 110, 112, 114, 116, 118 and 120 will be two units of voltage 4, 8, 16, 32, 64, 128 and 256 voltage units respectively.

Due to the inverter circuit 166 and the position of the adding circuit 122 in the tenth stage of the comparator 90, the signal on the conductor 164 due to the adding circuit 122 will be of the opposite polarity and 512 voltage units in magnitude. Thus, as previously indicated, the output on the conductor 164 from the comparator 90 may vary between −511 and +512 voltage units.

While the output on the conductor 164 will be a direct current signal with the structure shown in FIGS. 14A and 14B, the output on the conductor 164 may be an alternating current signal. To change the output on the conductor 164 to an alternating current signal, the converter circuit 210 illustrated in FIG. 15 may be positioned between the adding circuits and the analog ladder of the comparator 90. The converter circuit 210 includes the transformer 212 having the primary winding 214 and the secondary winding 216, the capacitors 218 and 220, diode 222 and resistor 224 connected as shown in FIG. 15. The secondary winding 216 of transformer 212 is center-tapped for a purpose to be considered subsequently.

In operation of the circuit illustrated in FIG. 15, when the transistor 226 of the adding circuit, which is representative of, for example, any of transistors 104 through 122, is not conducting, current flows through the resistors 224, diode 222 and resistor 228 so that the collector of transistor 226 is at a direct current value of one-half the power supply voltage. Thus, an alternating current signal whose peak-to-peak value is just less than the power supply voltage can be added to the direct current collector voltage through capacitor 218. The result is an undistorted modulated waveform at the collector which is applied to the ladder network through capacitor 220. Since the phase of the alternating current signals will be substantially identical at all levels of the analog ladder 230, the output from the analog ladder will then be an alternating current signal, the magnitude of which is determined by the conducting adding stages in the same manner as in the comparator 90.

It will be understood that the other side of the primary transformer 216 will be tapped for the last stage in the comparator or analog ladder. Thus, again an alternating signal having an opposite polarity will be provided from the last stage of the comparator so that the output from the analog ladder will vary about a zero alternating signal. A positive number is represented by one phase and a negative number by the opposite phase.

While one embodiment and a modification of the comparator of the invention have been disclosed in detail, it will be understood that other embodiments and modifications are contemplated by the inventor. Thus, the comparator of the invention can be implemented by fluid switching circuits in place of the electronic semiconductors illustrated. In the fluid embodiment of the invention it will be understood that the inverter stages, such as stage 144, would not be necessary since in the fluid switches both a carry and carry-not signal would be available from a single parallel carry circuit fluid switch by merely tapping the desired branch thereof. Also, codes other than the binary code may be implemented as will be understood by those in the art.

What I claim as my invention is:

1. An adding circuit for coded digital signals or the like, comprising switch means, an output circuit and bias means both connected to the switch means, said bias means controlling conduction of the switch means to determine presence or absence of an output in the output circuit, in accordance with the state of the bias means, said bias means including an input circuit having resistance means for limiting the contribution of the input circuit to the state of the bias means to two units when the input circuit is connected to a constant potential source, said bias means also including four drain circuits, one of which drain circuits has resistance means for limiting the contribution of the one drain circuit to the state of the bias means to two units, and the other three of which drain circuits have resistance means for limiting the contribution of the other three drain circuits to the state of the bias means to one unit apiece when signal input potentials are applied thereto.

2. An adding circuit for one stage of an adder of coded digital signals having a plurality of adder stages of different significance, each stage of the adder including a carry and a carry-not output circuit, comprising switch means, an output circuit connected to the switch means for providing an output when the switch means is in one of two alternative conditions thereof, a signal input circuit for providing an input signal to the adding circuit, an augend and addend signal circuit for each of a pair of signals to be added for providing an augend and addend signal to the adding circuit, a carry signal circuit for providing a carry signal from the next least significant adding stage to the adding circuit and a carry-not signal circuit for providing a carry-not signal from the next most significant adding stage to the adding circuit and bias means connected between each of the input signal circuit, augend and addend signal circuits, carry signal circuit and carry-not signal circuit and the switch means for placing the switch means in the one condition to provide an output from the output circuit on occurrence of either the augend or addend signals to be added in the adding circuit without the other signals being present, a carry signal from the preceding adding circuit without the other signals being present and on the presence of all of the input, augend, addend, carry and carry-not signals.

3. Structure as set forth in claim 2, wherein the bias means includes means for weighting each of the input, augend, addend, carry and carry-not signals and the input signal and the carry-not signal are each provided twice the weight of each of the augend, addend and carry signals by the weighting means.

4. A parallel carry circuit for coded digital signals or the like, comprising switch means, an output circuit and bias means both connected to the switch means, said bias means controlling conduction of the switch means to determine presence or absence of an output in the output circuit in accordance with the state of the bias means, said bias means including a plurality of pairs of current drain circuits connected to each other and to the switch means with each current drain circuit within a pair of current drain circuits having resistance means therein for equalizing the contribution of each of the current drain circuits of each pair of current drain circuits to the state of the bias means and for limiting the contribution of each pair of current drain circuits to the state of the bias means to twice that of the pair of current drain circuits corresponding to the next lower significant position in the coded digital signals, said bias means also including a current input circuit connected between a source of constant potential and the switch means having resistance means for limiting the contribution of the input circuit to the state of the bias means to half of the contribution of all the current drain circuits with signals present thereon when the constant potential source is applied to the input circuit.

5. A parallel carry circuit for one stage of an adder of coded digital signals including addends and augends of different significance which adder includes a plurality of adder stages of different significance corresponding to the significance of addends augends, comprising switch means, an output circuit connected to the switch means for providing an output when the switch means is in one of two alternative conditions thereof, a plurality of pairs of signal input circuits for providing an input signal to the carry circuit from the addend and augend pairs at each place of significance equal to and lesser than the significance of the one stage of the adder and bias means connected between each of the pairs of signal input circuits and the switch means for placing the switch means in the one condition only in response to any combinations of augend and addend input conditions represented by locations on one side of the diagonal of a Karnaugh map.

6. A comparator comprising input terminals having a plurality of significant positions for receiving coded, digital numbers to be compared, a single switch means adding circuit for each significant position of the numbers to be compared connected to receive an input from the terminals at the corresponding significant positions, a plurality of corresponding single switch means parallel carry circuits for providing a carry signal in a related significant position and a carry-not signal for the preceding significant position which parallel carry circuits are connected to receive an input from the corresponding significant position terminals and at least some preceding significant position terminals and to simultaneously provide an output to the adding circuits, and means connected to receive the output signals from the adding circuits for providing an output representative of the comparison of the numbers received at the input terminals.

7. A comparator comprising a source of coded digital numbers to be compared having a plurality of significant positions, an adding circuit for each significant position of the numbers to be compared connected to the source of the numbers, a plurality of corresponding single switching elements connected between the source of coded digital numbers and the adding circuits to receive inputs from said source of coded digital numbers from at least one group of significant positions thereof and to receive an auxiliary carry function from another group of lesser significant positions for providing a carry signal to the adding circuits corresponding to the one group of significant positions in a switch time simultaneously.

8. A comparator comprising a source of coded digital numbers to be compared including augend and addend pairs of different significance, an adding circuit for each significant position of the numbers to be compared, each having an output signal, a plurality of corresponding single switching elements connected to receive inputs from said source of coded digital numbers for providing a parallel carry signal to the corresponding adding circuits simultaneously and for providing a carry-not signal to the adding circuit in the preceding significant position of the numbers to be compared.

9. A comparator including two input register circuits for parallel receiving binary coded digital numbers to be compared, a plurality of adding circuits in stages corresponding to the significant positions of the numbers to be compared, each including a single semiconductor connected to receive the input signal from both input registers for a particular significant position in the numbers to be compared, a carry signal for the respective stage and a carry-not signal from the next stage, a plurality of parallel carry circuits including a single semiconductor for receiving input signals from each significant position in the input registers up to and including the particular significant position the respective stage is associated with and for providing a carry-not output signal to the preceding stage, an inverter for receiving the carry-not signal and providing a carry signal to the particular stage which the specific parallel carry circuit is associated with and an analog ladder for receiving the output from the plurality of adding circuits to provide an output representative of the comparison of the input numbers.

10. Structure as set forth in claim 9 wherein at least one of the parallel carry circuits is fed signals from the input register circuit only from the significant position associated with the respective carry circuit and a carry signal from the preceding stage.

11. Structure as set forth in claim 9 and further including an inverter connected between the adding circuit of the most significant digit stage of the comparator and the most significant digit stage of the analog ladder whereby the output from the analog ladder is in both directions about a zero output.

12. Structure as set forth in claim 9 wherein at lease some of the parallel carry circuits are fed signals from the input register circuits only after a predetermined significant position of the numbers to be compared and are also fed a single carry signal from the stage preceding the predetermined significant position.

13. A comparator including a plurality of adder stages, a plurality of carry stages connected to the adder stages, an analog ladder for providing an alternating current output from said comparator having a plurality of significant positions and a single capacitor connected between each adder stage and each significant position of the ladder for passing only alternating current signals to the ladder under control of the adder stages.

14. Structure as set forth in claim 13 and further including a second capacitor connected in series with the first capacitor and a secondary winding of a transformer connected in series with the second capacitor.

15. Structure as set forth in claim 13 wherein all of the alternating current signals are equal and further including means for inverting the alternating current signal under the control of the most significant adder stage.

16. A comparator comprising a source of coded digital numbers to be compared, an adding circuit for each significant position of the numbers to be compared, each having an output signal, a plurality of corresponding single switching elements connected to receive inputs from said source of coded digital numbers and for providing a carry signal to the corresponding adding circuits and a carry not signal to the adding circuit in the preceding significant position of the numbers to be compared.

17. Structure as set forth in claim 16, and further including means connected to receive the output signals from the adding circuits for providing an analog output representative of the comparison.

18. The adder as defined in claim 16 wherein the input addend and augend signals utilize the noncomplemented form at all significant positions thereof.